J. M. McFADDEN.
JOURNAL BOX.
APPLICATION FILED SEPT. 22, 1909.
965,398.
Patented July 26, 1910.
2 SHEETS—SHEET 2.
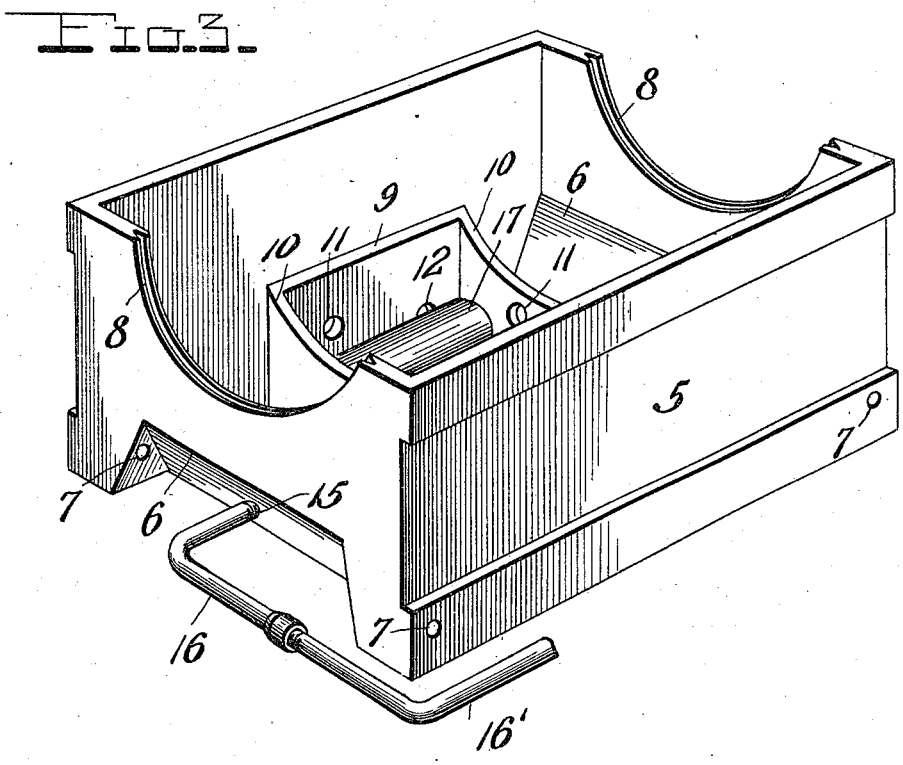
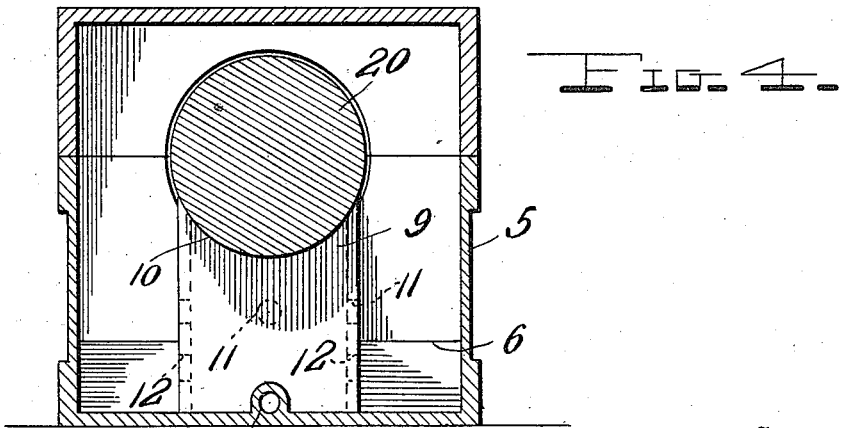
Witnesses
Chas. L. Griesbauer.
H. F. McQuay.
Inventor
J. M. McFadden
By Watson E. Coleman
Attorney

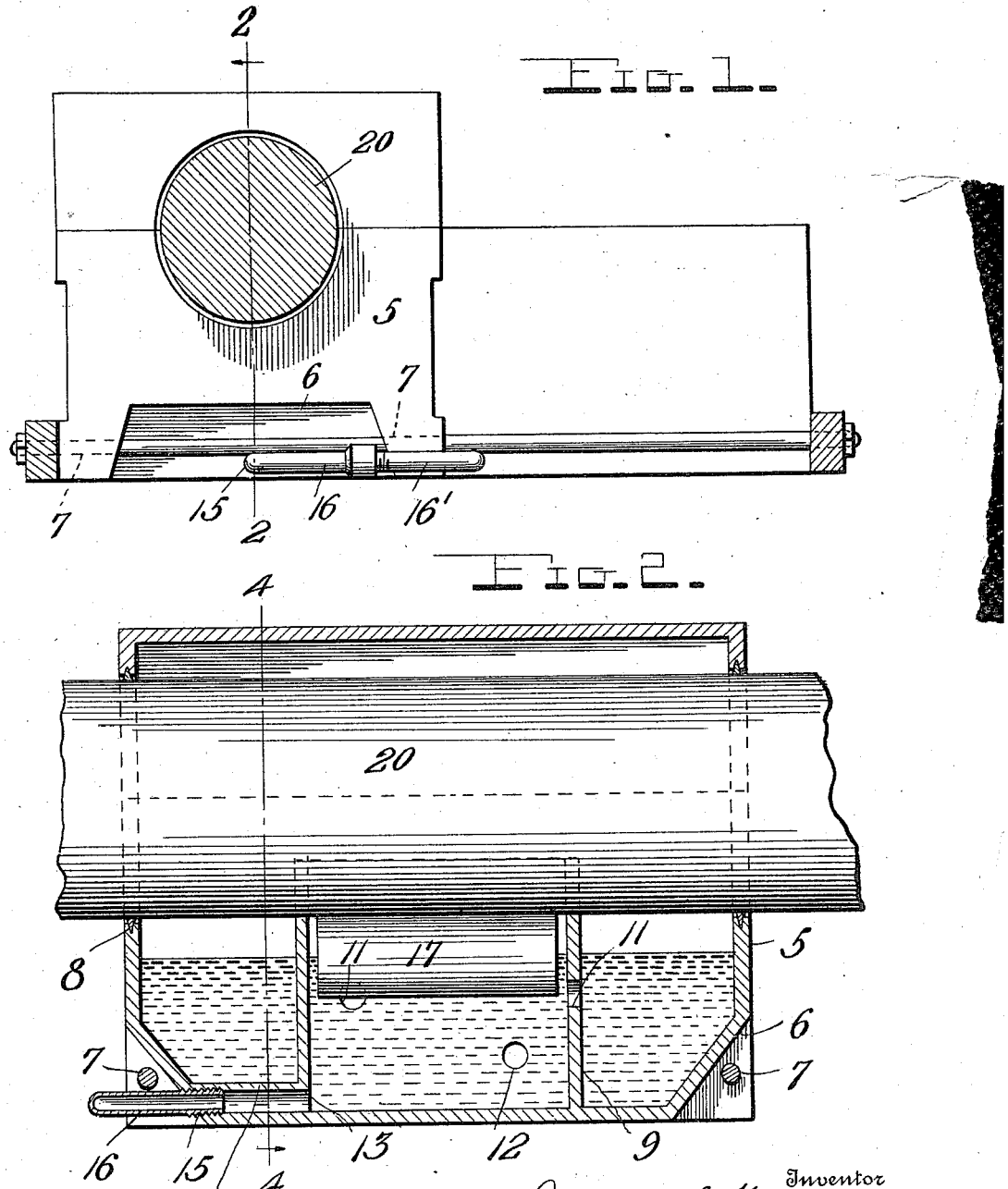

UNITED STATES PATENT OFFICE.

JOHN M. McFADDEN, OF BEAUMONT, TEXAS.

JOURNAL-BOX.

965,398.

Specification of Letters Patent. Patented July 26, 1910.

Application filed September 22, 1909. Serial No. 518,978.

*To all whom it may concern:*

Be it known that I, JOHN M. McFADDEN, a citizen of the United States, residing at Beaumont, in the county of Jefferson and State of Texas, have invented certain new and useful Improvements in Journal-Boxes, of which the following is a specification, reference being had to the accompanying drawings.

This invention relates to certain new and useful improvements in journal boxes and has for its primary object to provide a device of this character whereby the continual disassembling of the boxing to replenish the lubricant contained therein will be avoided.

Another object is to provide a journal box having a movable journal engaging member therein which is adapted to distribute the lubricant upon the periphery of the journal, thereby preventing wearing and overheating of the journal box.

A further object is to provide a simply constructed device of the above character, wherein the lubricating oil may be fed into the same without necessitating the removal of any of the parts.

With these and other objects in view, the invention consists of the novel construction, combination and arrangement of parts, hereinafter fully described and claimed, and illustrated in the accompanying drawings, in which—

Figure 1 is an end elevation of the drive box such as is usually employed on locomotives, illustrating an embodiment of my improved journal box; Fig. 2 is a section taken on the line 2—2 in Fig. 1; Fig. 3 is a detail perspective view of the lower section of the box removed; and Fig. 4 is a section taken on the line 4—4 of Fig. 2.

In the usual construction of drive boxings as employed upon locomotives, the cellar or journal box upon which the journal bears must often be removed to replenish the waste material therein which is engaged by the periphery of the journal and contains the lubricating material. My present invention is designed to obviate this inconvenience and comprises the substantially rectangular box or casing 5 which is formed at its ends and at the bottom thereof with the recesses or cut away portions to provide inwardly inclined surfaces 6. Extending transversely through the ends of the box and from the opposite sides thereof are the bolt holes 7 through which the attaching bolts may be passed to secure the box in position.

The upper edges of the ends of the box are provided with the longitudinal grooves 8 which are adapted to receive Babbitt metal or other anti-friction material with which the journal has frictional engagement, thus preventing wear upon the ends of the box. This friction material may be renewed when desired. Within the box and spaced from the sides and ends thereof there is a housing 9, the ends of which are downwardly curved on the same radius as the ends of the boxing 5, as clearly shown at 10 in Fig. 3. This housing is provided with a plurality of openings 11 and 12. It will be noted that the openings 11 are disposed at a higher point above the bottom of the boxing than the openings 12. As shown in the drawings five of such openings would preferably be employed, three of which are located at the higher point.

By arranging the openings in the housing as above set forth, a free flow of the oil to the interior thereof is always maintained. The particles of metal which are worn from the edges of the housing by the rotation of the journal thereon are deposited within the casing, and in the event that the lowermost openings 12 should become filled with such material and prevent the entrance of the oil therethrough, the fluid may still flow through the upper openings 11 whereby a constant supply of the lubricating fluid will be furnished to the periphery of the journal.

The opening 13 is formed in the opposite end of the box to that in which the oil opening 11 is disposed, and the base of the box 5 is formed with a conducting passage for the oil as shown at 14. This conducting passage extends from an opening 15 in the end of the box 5 to the interior of the housing 9. In the opening 15 one end of a feed pipe 16 is threaded. This pipe is in the form of an elbow joint, the main supply pipe 16' having threaded engagement in the outer female end thereof, the male end of the elbow being positioned through the box 5. Within the housing 9 a float 17 is disposed. This float is preferably of cylindrical formation and is composed of cork.

In the operation of the device, the journal is positioned upon the downwardly curved upper edges of the box 5 and the housing 9, and upon the rotation of said journal the cork float 17 engages with the periphery thereof and distributes the lubricating fluid upon the same. The journal 20 is entirely supported upon the metallic anti-friction strips secured in the grooves 8 in the ends of the journal box, and the upper edge of the housing 9 is closely engaged upon the periphery of the journal and removes the superfluous oil therefrom. Thus it will be seen that all wear upon the ends of the journal box is prevented as the anti-friction strips may be renewed when the same become worn away. As the journal 20 and the cork 17 will rotate in opposite directions, the oil will be constantly supplied to the shaft.

The box 5 and the housing 9 would preferably be cast in one piece although it will of course be obvious that if desired they may be separately formed and secured together in any suitable manner. The device is moreover simple in its construction, very efficient in operation, and may be produced at a minimum cost.

Having thus described the invention, what is claimed is:

A journal box comprising a rectangular casing, a removable cover for said casing, the opposed end edges of said cover and casing being provided with semi-circular recesses to receive a journal, the recessed edges of the cover and casing being provided with V-shaped grooves to receive strips of anti-friction material adapted to engage upon the periphery of the journal, the end walls of said casing being inwardly inclined adjacent to the bottom of the casing, a housing centrally arranged in said casing, said housing having a feed passage communicating therewith, an oil supply pipe threaded into the outer end of said passage, and a float arranged in said housing adapted to engage with the periphery of the journal to be rotated thereby, the upper edges of the walls of the housing having close engagement upon said journal.

In testimony whereof I hereunto affix my signature in the presence of two witnesses.

JOHN M. McFADDEN.

Witnesses:
BLANCHE McFADDEN,
H. C. SCHWAUER.